United States Patent [19]

Fleigle et al.

[11] Patent Number: 4,787,923
[45] Date of Patent: Nov. 29, 1988

[54] APPARATUS FOR CLEANING AN AIR FILTER

[75] Inventors: Mark J. Fleigle, Maple Grove; Robert A. Geyer, Champlin; Mark D. Kinter, Spring Park, all of Minn.

[73] Assignee: Tennant Company, Minneapolis, Minn.

[21] Appl. No.: 110,937

[22] Filed: Oct. 20, 1987

Related U.S. Application Data

[63] Continuation of Ser. No. 900,747, Aug. 27, 1986, abandoned.

[51] Int. Cl.[4] ............................................. B01D 46/04
[52] U.S. Cl. ........................................ 55/304; 55/497; 55/502; 55/507
[58] Field of Search ............... 55/304, 497, 505–509, 55/502, 521

[56] References Cited

U.S. PATENT DOCUMENTS

| | | | |
|---|---|---|---|
| 2,962,121 | 11/1960 | Wilber | 55/497 X |
| 3,342,021 | 9/1967 | Yelinek et al. | 55/502 X |
| 3,360,910 | 1/1968 | Soltis | 55/508 X |
| 3,415,040 | 12/1968 | Pool et al. | 55/505 X |
| 3,618,300 | 11/1971 | Pausch | 55/502 X |
| 3,901,671 | 8/1975 | Kitami | 55/304 |
| 4,373,227 | 2/1983 | Kimzey et al. | 55/304 X |
| 4,557,739 | 12/1985 | Fortmon et al. | 55/320 |

FOREIGN PATENT DOCUMENTS 0009979  1/1977  Japan ................................ 55/304

Primary Examiner—Charles Hart
Attorney, Agent, or Firm—Kinzer, Plyer, Dorn, McEachran & Jambor

[57] ABSTRACT

This is concerned with an air filter cleaning arrangement in which the filter element, meaning the pleated filter media and its frame, is functionally connected to a vibrator so that it is resiliently or vibrationally isolated from the surrounding structure. The major effective component of the vibratory motion applied to the filter media is across the width of the filter pleats. The invention is used primarily in an industrial sweeper. It can also be used in other machines or equipment which have air filter.

24 Claims, 3 Drawing Sheets

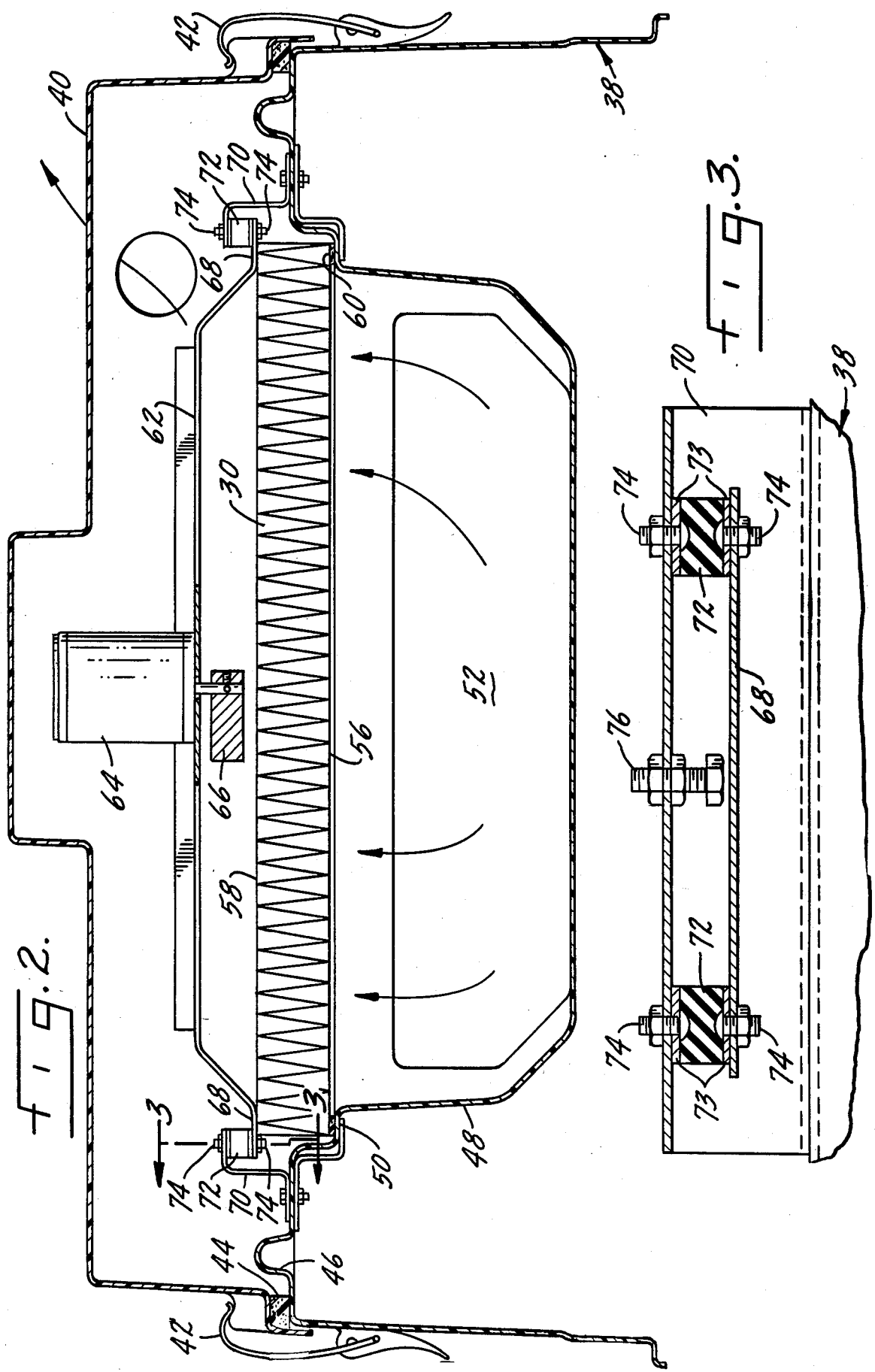

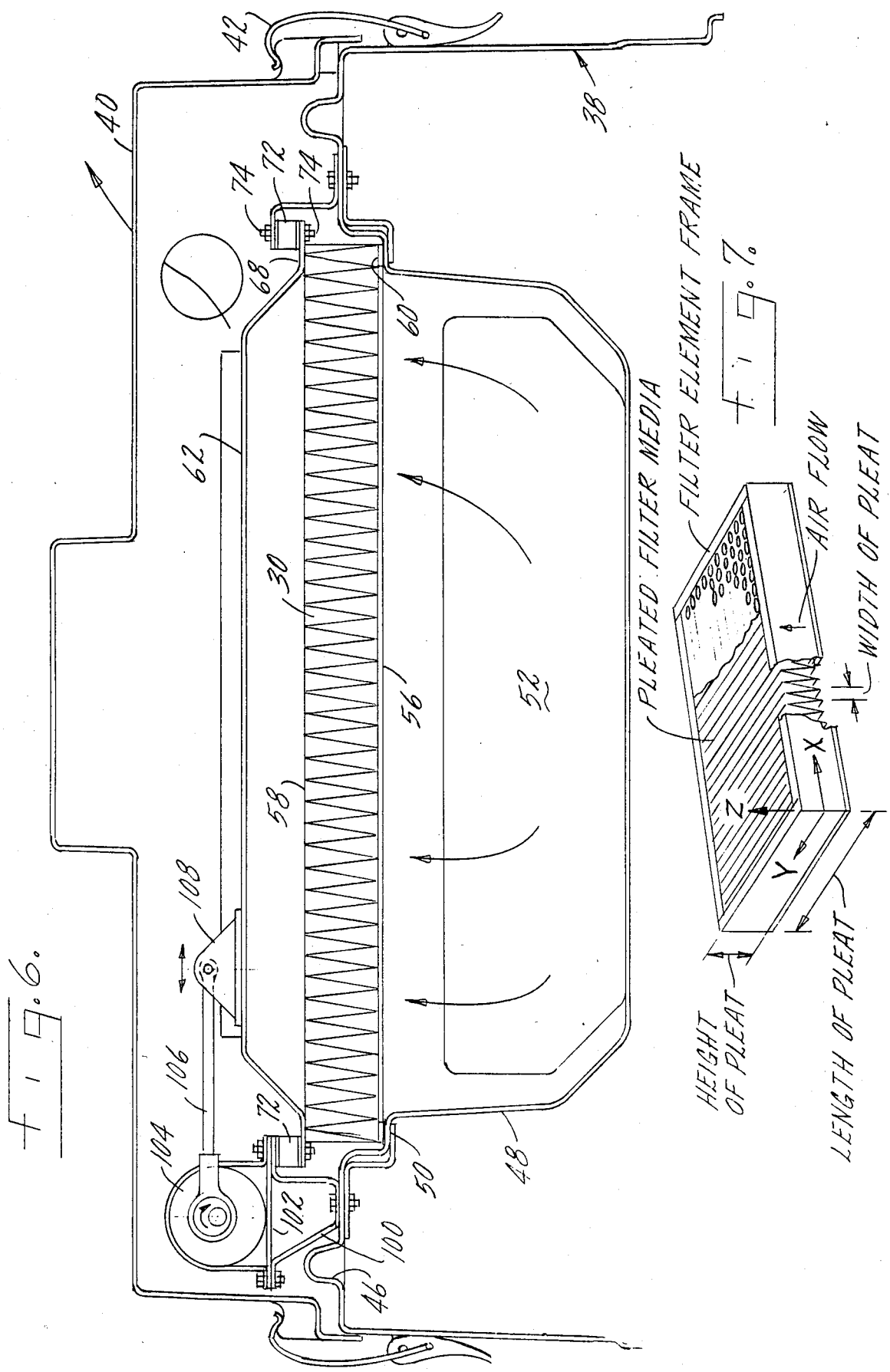

APPARATUS FOR CLEANING AN AIR FILTER

This is a continuation of application Ser. No. 900,747 filed Aug. 27, 1986 and now abandoned.

SUMMARY OF THE INVENTION

This invention is concerned with the arrangement in an industrial sweeper of an air filter having pleated media.

A primary object is a cleaning arrangement for an air filter of the above type which transmits vibratory energy to the filter to shake dirt and dust loose from the filter media more efficiently than prior filter shakers.

Another object is a filter shaker in which the major component of the applied vibration is across the width of the filter pleats.

Another object is a filter shaker or cleaner which eliminates impact forces, resulting in increased durability for the filter and the shaker mechanism.

Another object is a filter cleaning arrangement in which the elimination of impact forces permits lower cost in that the filter box and related parts can be made of lower cost material, such as plastic instead of steel, and the motor mounting can be made of mild steel instead of heat-treated spring steel.

Another object is a filter cleaner of the above type which has a much lower noise level.

Another object is a filter shaker of the above type which provides more uniform shaking of the entire filter media.

Another object is a filter shaker of the above type which uses fewer parts.

Another object is a filter shaker of the above type which provides reduced current draw on the shaker motor, thereby increasing the life of the motor and the run time on a battery powered machine.

Other objects will appear from time to time in the ensuing specification and drawings.

BRIEF DESCRIPTION OF THE DRAWINGS

FIG. 2 is an enlargement in section of the filter arrangement in FIG. 1 turned 90°;

FIG. 3 is a section along line 3—3 of FIG. 2 on an enlarged scale;

FIG. 6 is a section similar to FIG. 2 showing a further modification; and

FIG. 7 is a diagrammatic illustration of a flat panel pleated media filter element with explanatory labels.

BRIEF DESCRIPTION OF THE PREFERRED EMBODIMENT

Figure 1:
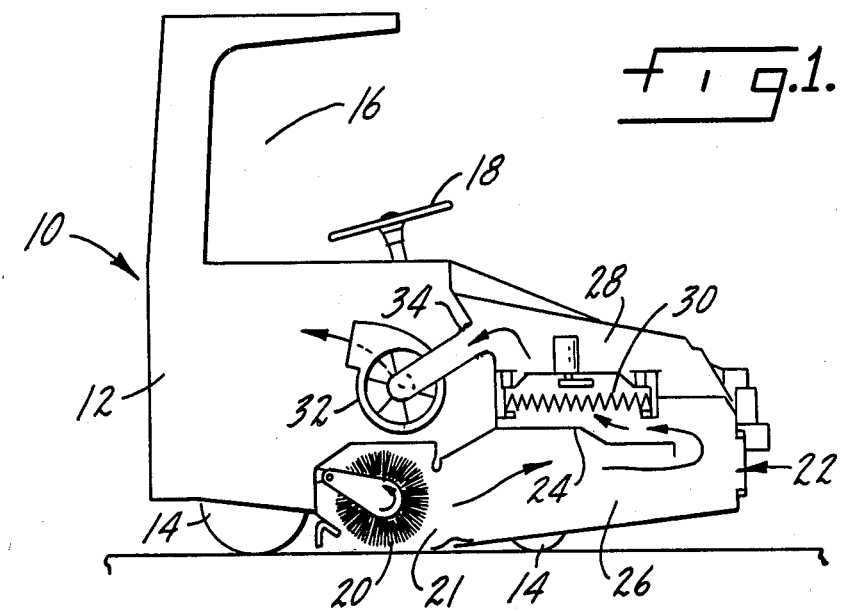
FIG. 1 is schematic of a sweeper using the present invention.

In FIG. 1, a sweeper has been shown in outline generally at 10 with a frame 12 on wheels 14 and an engine, not shown, so that it is self-propelled in the usual manner. As shown here, it is a rider-type unit with the operator having a seat or compartment 16 and various controls 18. However, this invention is equally applicable to a walk-behind sweeper.

A main brush 20 is disposed laterally across the unit and rotates counterclockwise in FIG. 1 so that it propels debris forwardly through an inlet opening 21 into a trash bin or hopper 22. A baffle 24 generally divides the hopper into a lower trash compartment 26 and an upper filter compartment 28 which has a filter element, diagrammatically indicated at 30, which is shown as the so-called flat panel pleated media variety. A vacuum fan 32 of any suitable type exhausts air from around the main brush through a suitable connection 34 which, in this case, is shown at a point remote from the hopper inlet 21.

A typical flat panel, pleated media filter element is shown in FIG. 7. The frame and the width, height and length of the pleats are indicated as the terms are commonly used and will be so used here.

The filter element 30 is shown enlarged in FIG. 2 and has been turned 90° from what is diagrammatically shown in FIG. 1. This is to say that in FIG. 1 the filter element is diagrammatically indicated as being disposed with the length of its pleats laterally or across the frame of the machine, whereas in FIG. 2 the filter element is shown with the length of its pleats fore and aft or longitudinal. It should be understood that they may be disposed either way and the invention or subject matter hereof is equally applicable.

In FIG. 2, a lower housing or enclosure is indicated generally at 38 and an upper housing or cover at 40 with a releasable clamp arrangement 42 on each side, effective through a suitable seal 44 to define and seal the filter compartment. It will be noted that the lower housing 38 is formed inwardly on each side as at 46, then downwardly at 48 into a compartment or chamber with a shoulder at 50, which should be considered to be continuous all the way around the filter element and generally rectangular. The lower compartment defined by the bottom or sump 48 provides an inlet 52 for the dirty or dusty air coming to the filter element from the trash compartment 26 in FIG. 1.

The filter element 30 is positioned on ledge 50 and is shown as a conventional flat panel filter having a nonwoven pleated media, commonly referred to as a pleated paper filter, although "paper" is a bit of a misnomer. In any event, it may be or take the form of a rectangular or square flat frame with a pleated media secured therein and possibly a sheet of perforated metal on the outlet side. For purposes of identification and orientation, the filter element has an inlet side 56 and an outlet side 58. The filter element has a resilient foam seal strip 60, for example urethane, glued or otherwise connected to its frame all the way around the edge on the inlet or upstream side of the filter, which rests and seals against the shoulder or offset 50 formed in the housing.

A bridge 62 extends across the filter element and supports or carries an electric motor 64 which has an eccentric weight or vibrator 66 attached to its output shaft, shown as disposed generally in the middle of the bridge. The bridge has offset ends 68 which are resiliently clamped against the outlet side of the filter element by brackets 70 with rubber mountings 72, shown in this case as two on each side. Bolts 74 or the like are riveted or welded to plates 73 which are bonded to the rubber that comprises resilient mount 72. Bolts 74 extend through the inner end or edge of the bracket 70 and through the outer end 68 of the vibrator bridge. The result is that the bridge and vibrator are firmly in contact with the frame of the filter element 30, but are resiliently isolated from the brackets 70 and housing elements 48 and 46. The rubber mountings 72 hold the filter element down against the offset 50 in the housing through the foam gasket 60, which is a resilient material that provides a resilient support for the filter element as well as sealing to prevent air leakage around it. The result is that the filter assembly, including the filter element itself, the bridge and the vibrator are vibrationally isolated from the frame of the machine.

It will also be noted that the eccentric 66 on the motor rotates in a plane parallel to the length and width of the filter pleats as shown in FIG. 7. None of the vibratory force is delivered in the direction of the height of the pleats. The individual pleats of the filter element are quite flexible across their width but are relatively rigid along their length, so they flex principally in the direction of their width. This has been found to be substantially more effective in causing the dust adhering to the lower surface of the pleats to shake loose and fall into the sump 48 than shaking the filter up and down in the direction of the height of the pleats as prior art shakers have done.

On each end of the bridge, there may be a bolt or stop 76, shown in FIG. 3, positioned between the two rubber mountings 72. When the sweeper is running and air is being drawn up through the filter, the air pressure tends to lift the filter element. If it lifts very much, it will lift the bottom seal 60 off of its seat 50 and air will leak around the filter element. The stops 76 are set so that the filter element is allowed to rise until its frame bears against them, thereby compressing the rubber mountings 72 somewhat in response to air pressure, but not enough so that the seal is lost at 60. This is to say that the filter element is initially installed with sufficient preload through the rubber mountings 72 into the urethane foam seal 60, so that with maximum air pressure, some of the load will be taken off of the urethane seal 60, but not all of it. Thus, the sealing contact is maintained during maximum air flow.

Figure 4:
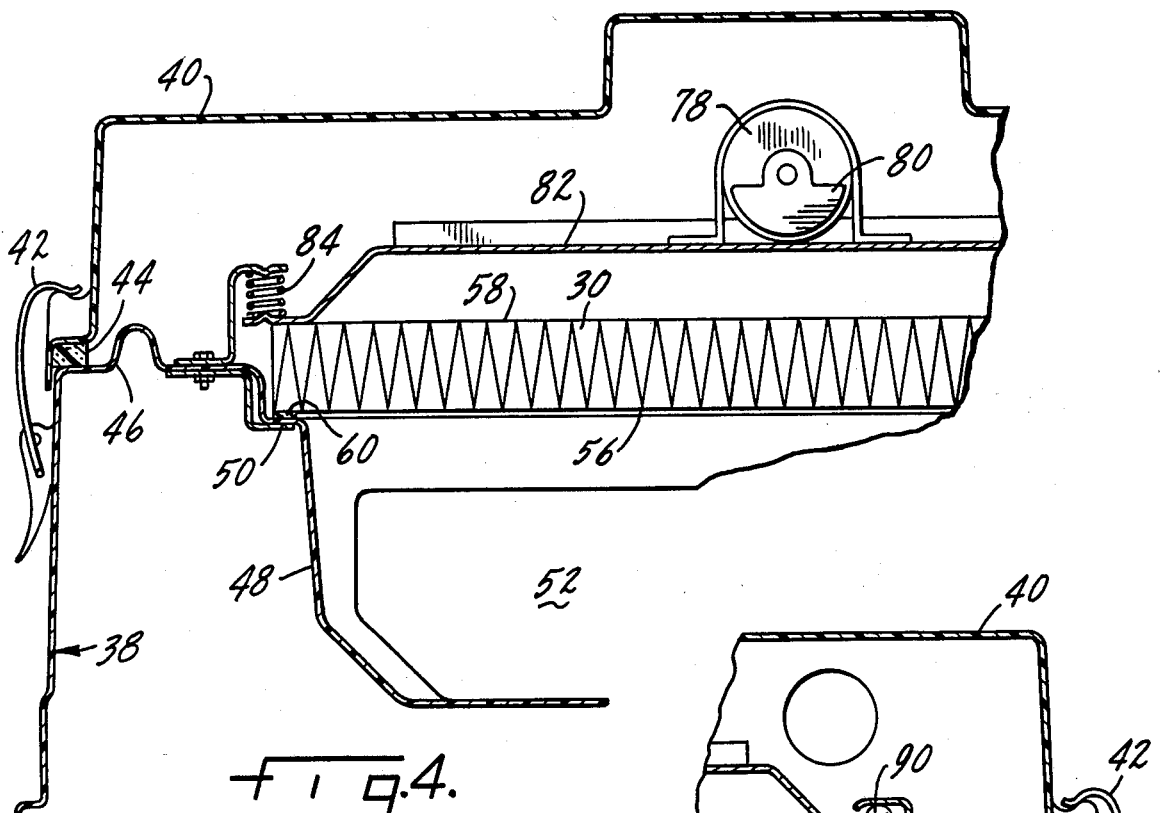
FIG. 4 is a partial view in section similar to FIG. 2, but of a modified form.

In FIG. 4, a variant form has been shown in which the filter element, the sweeper housing, etc. may be assumed to be the same. The electric motor 78 has been mounted 90° from what is shown in FIG. 2 and, therefore, the eccentric weight 80 attached to its shaft creates movement in a plane parallel to the width and height of the filter pleats. The bridge 82 may be generally the same as is the mounting structure for the filter. The rubber mountings 72 have been replaced by coil springs 84 which will function in the same manner as the rubber supports.

Mounting the shaker motor with its axis parallel to the length of the filter pleats generates forces in the directions of the width and height of the pleats, which will shake the filter in those directions. Shaking across the width of the pleats will loosen the dust on them and shaking across the height of the pleats may assist in causing the dust to drop off. However, mounting the shaker motor in this fashion may cause more force to be transmitted into the shoulder 50 of lower housing 46–48 than is transmitted when the motor is mounted as in FIG. 2, hence the arrangement of FIG. 2 may be preferable.

Figure 5:
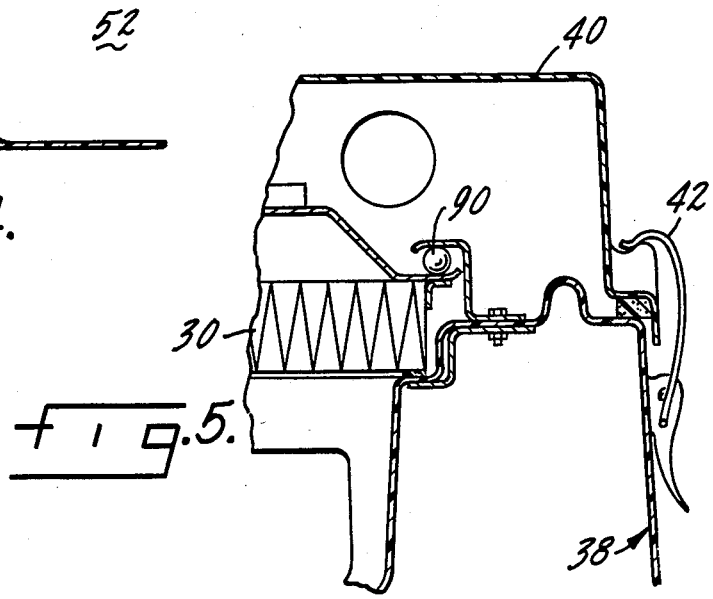
FIG. 5 is a partial view in section of a further variant.

In FIG. 5, a variation has been shown in which the rubber mounting of FIG. 2 has been replaced by a rigid ball 90 disposed between the clamp and one end of the vibrator bridge. Four balls could be positioned, two on each end of the filter element, which would allow movement of the filter assembly in the direction of the length and width of the filter pleats, but would prevent movement in the direction of the height of the pleats. Rigid balls, being incompressible, would eliminate need for the stop bolts 76 in FIG. 3.

In the embodiment of FIG. 6, the filter and its mounting arrangement are the same as illustrated in FIG. 2. What is different about the construction in FIG. 6 is the application of a vibratory force to the filter. Insofar as possible, identical parts have been given the same numbers as in the FIG. 2 construction.

A small bracket 100 is bolted onto housing section 46 and supports a motor mounting plate 102. Attached to plate 102 is a motor 104 which has a crank arm 106 attached for eccentric rotation about the motor shaft, with the crank arm having its opposite end pivoted to a bracket 108. Bracket 108 is attached to one side of bridge 62. Rotation of motor 104 will vibrate bridge 62 through the crank arm 106 and its associated bracket 108 in a direction parallel to the width of the filter pleats. Since filter element 30 is effectively isolated by the rubber mountings 72 and the foam seal 60, very little of the vibration applied by the motor to the filter will be transmitted to the surrounding structure. However, the reaction forces in the motor itself will be transmitted through bracket 100 into housing structure 46, so to that degree the arrangement of FIG. 6 is less desirable than the arrangement of FIG. 2.

The use, operation and function of the invention are as follows.

Mobile sweepers use a vacuum system to eliminate or reduce dusting. An air filter is normally installed in the unit and from time to time must be cleaned, which conventionally takes the form of shutting down the vacuum system and vibrating or shaking the filter media so that dirt and dust fall off. Various types of beaters and vibrators have been employed. One which has been used by the assignee of this application is disclosed in U.S. Pat. No. 4,258,451. However, it has required careful attention to avoid fatigue failures in various structural parts. It is desirable to make the filter box itself out of inexpensive material, such as a plastic, but hereinbefore this has generally not been practical because it would quickly fatigue and fail due to forces transmitted into it from the action of the filter shakers. Also, it has been desirable to reduce the required power input to the shaker motor, reduce the noise and shake the entire filter media more uniformly.

The invention is shown and described in connection with what is known as a flat panel, pleated media filter, since this is conventionally used in many forms of present-day filtering systems. However, it is also applicable to other configurations of filters.

The present invention involves isolating the filter element and preferably the vibration mechanism also from the structural parts of the sweeper or machine which support the filter so that the filter element will basically use the vibrations in the direction of the width of its pleats to shake the pleats so that the dirt and dust will be dislodged. It is preferred that the vibrator be of a type that will apply the vibrations basically in a plane generally parallel to the length and width of the pleats, which is the arrangement shown in FIG. 2. The result will be that while the vibrations will be applied to the filter throughout the full 360°, the components of the vibration applied in the direction of the length of the pleats will be relatively ineffective due to the stiffness of the pleats in that direction, whereas those applied in the direction of the width of the pleats will cause them to flex in the direction of their width, which has been found to be effective in removing or dislodging dirt and dust. The arrangement shown in FIG. 2 does not have forces in the direction of the height of the pleats applied to the filter panel, but rather by using a motor shaft parallel to the height of the pleats, the unbalanced forces are in the directions of the length and width of the pleats which is most effective in shaking out dust. It will be understood that the vacuum fan 32 is shut down or closed off so that the air flow is stopped while the filter is being cleaned, which can be done by either shutting off the fan or closing off the air duct 34 during the cleaning cycle, which is conventional.

Loading or compressing the foam sealing strip 60 on the inlet face of the filter panel and using the stops 76 so that even under maximum air pressure the seal 60 is still effective prevents dirty air from leaking around the filter element. The continuous seal 60 on the inlet face plus the rubber mountings, shown as 72 in FIG. 2, which bear on the outlet face of the filter frame through the bridge, effectively isolate the filter element and the vibrating mechanism so that very little of the vibration from the eccentric weight is transmitted to the structural parts of the machine. This reduces the stress in the structural parts and permits more economical construction, such as a plastic filter box.

The variation shown in FIG. 5 also isolates the filter panel and vibrator from the machine and further has the advantage that the seal around the inlet face of the filter panel is constant since the rigid balls do not compress. The object in all forms is to give the filter element freedom to move in the directions in which the vibrator generates forces. This isolates the movement of the filter element from the surrounding structure, which reduces the forces transmitted into that structure. At the same time, those components of the filter element movement which are in the direction of the width of its pleats have been found to be very effective in causing dirt and dust to be dislodged from the filter media.

Another advantage of the invention is that whereas in prior devices, as shown in U.S. Pat. No. 4,258,451, the bridge supports for the motor had to be heat-treated spring steel, the present arrangement works satisfactorily with its motor supporting bridge made of ordinary mild steel, which is a cost saving. In addition, the eccentric weight on the motor may be substantially lighter than those used previously. This causes the motor to draw less current than previous units which permits longer run time on battery powered machines. The noise level is greatly reduced and the filter elements last longer than they used to.

Whereas the filter element has been referred to and shown as a conventional flat panel with a pleated filter media in the frame, it should be understood that one significant aspect of the invention is applying vibrations to such a panel in a manner that is the most effective in dislodging collected foreign particles. A representative panel such as shown in FIG. 7 has the length of its pleats disposed in a certain direction which is indicated, for purposes of orientation, by the coordinate Y with the width of the pleats being along the coordinate X generally at right angles thereto and the height of the pleats, i.e. the thickness of the panel, being along the coordinate Z. The most effective vibration to dislodge collected foreign material from the pleats is at right angles to their height and length, which is to say in the direction of coordinate X. This tends to flex the individual pleats between their ends which is to say across or at right angles to their length, coordinate Y, and this flexing very effectively dislodges accumulated material so that it will fall from the panel which may be assumed to be generally flat and disposed more or less horizontally.

Vibrations or oscillations applied along coordinate Y will be parallel to the length of the pleats and will have some particle dislodging effect but not anywhere near as great as shaking the panel along coordinate X.

The same is true of shaking or vibrating the panel in a plane parallel to the height of the pleats, i.e. along coordinate Z. Such activity also may have some beneficial particle dislodging effect, but this is not considered as effective as vibrations or shaking along coordinate X which is considered extremely important. This is to say that vibrations along Y and Z may well be beneficial but they are supplementary and it is the vibrations along coordinate X that are considered to be the most important or most effective.

The vibrator of FIG. 2 will give vibration along the X and Y coordinates but not Z.

The FIG. 4 form of vibrator will produce movement along X and Z but little if any along Y. The panel mounting in FIG. 4 allows for more or less free movement along X, Y and Z.

The FIG. 5 mounting is more or less the same except that movement along Z is quite restricted if at all.

The mounting of the filter panel in FIG. 6 may be considered to be the same as FIG. 2 but the vibrator applies motion along the X coordinate only which is across the width of the pleats and is quite effective.

The X, Y and Z coordinates are used simply for purposes of orientation and explanation and are not to be interpreted as limiting in any significant respect.

It can thus be seen that the invention is a combination of how the panel is mounted in combination with how the vibrations applied to it are directed. In all situations vibrations perpendicular to the height and length of the pleats, which is to say in the direction of pleat width, i.e. the X coordinate in FIG. 7 is considered very important with movement in the other directions being supplemental and definitely helpful.

While a motor whirling an eccentric weight has been shown and described, it should be understood that suitable other vibrating mechanisms may be used. This is to say that any type of vibrator should be considered as applicable. For example, FIG. 6 shows a motor arranged to vibrate a filter element through a crank and connecting rod. The filter is resiliently isolated from the surrounding structure, and the vibration is in the direction of the width of the filter pleats. Also, the invention has been shown in an industrial sweeper, but it should be understood that it has application to any air filter which is cleaned by shaking or vibrating the filter. For example, it might be used in stationary installations, such as in dusty factory environments. Also, the invention has been shown and explained in connection with a flat panel filter having non-woven pleated media, but it is not necessarily limited thereto.

We claim:

1. In an air filter assembly, a support housing, a filter frame in the support housing, a filter medium in the filter frame formed with pleats having height, width, and length, said filter medium being joined to and supported by said filter frame, a resilient mounting between the filter frame and the support housing so that the filter frame is resiliently isolated from the support housing at least in the direction of the width of the filter pleats, and vibrating means in continuous contact with said filter frame for vibrating said filter medium and filter frame to dislodge dirt and dust from the medium with the major effective component of the vibrations being across the width of the filter pleats.

2. The air filter assembly of claim 1 further characterized by and including the resilient mounting for the filter frame that resiliently isolates it from any surrounding structure.

3. The filter assembly of claim 2 further characterized in that the resilient mounting includes rubber shock elements on one side of the filter frame and a resilient filter seal around the periphery of the other side of the filter frame.

4. The filter assembly of claim 2 further characterized in that said resilient mounting includes a plurality of spring elements on one side of the filter frame and a resilient filter seal around the periphery of the other side of the filter frame.

5. The filter assembly of claim 1 further characterized by and including the mounting for said frame which restricts the frame and filter media from movement in a direction across the height of the filter pleats.

6. The filter assembly of claim 5 further characterized in that said vibrating means applies vibratory motion both along the length of said filter pleats and across the width of said filter pleats, with the principal effective component of vibration being across the width of the filter pleats.

7. The filter assembly of claim 5 further characterized in that said resilient mounting includes a plurality of balls which allow the frame and filter media to move in directions both across the width and along the length of said filter pleats.

8. The structure of claim 1 further characterized in that said vibrating means is a motor with an eccentric weight attached to its output shaft, with the axis of the motor being generally parallel to the height of said filter pleats.

9. The filter assembly of claim 1 further characterized in that said pleated filter media is disposed in a generally planar configuration, with the height of the filter pleats being perpendicular to the general plane of said filter media.

10. The filter assembly of claim 9 further characterized in that said vibrating means is a motor with an eccentric weight attached to its output shaft, with the axis of the motor being generally perpendicular to the general plane of the filter media.

11. The filter assembly of claim 9 further characterized in that said vibrating means includes a motor mounted adjacent to the filter frame with a connecting arm connected for eccentric rotation about the shaft of said motor and pivotally connected to the filter frame to apply vibration to the filter media in a direction generally across the width of said filter media pleats.

12. The filter assembly of claim 1 further characterized in that said vibrating means is a motor with an eccentric weight attached to its output shaft, with the axis of the motor being generally parallel to the length of the filter media pleats.

13. In an air filter assembly for use in an industrial sweeper or the like, a mobile sweeper, a filter support on the sweeper, a filter frame, an isolation mounting for said filter frame in said support, filter media formed with pleats having a height, width, and length joined to and supported by said frame, said filter media having an air input and an air outlet, and vibration means in the sweeper in continuous engagement with the filter frame for vibrating said filter media and frame, with the major effective component of the vibration being across the width of the filter media pleats.

14. The filter assembly of claim 13 further characterized in that said filter frame is generally planar in configuration with said vibrating means only applying vibratory motion to said filter media and frame in directions across the width of the media pleats and along the length of said media pleats.

15. The filter assembly of claim 13 further characterized in that said filter frame is generally planar in configuration, with said vibrating means being a motor with an eccentric weight attached to its output shaft, with the axis of the motor being at right angles to the plane of the filter frame.

16. The filter assembly of claim 13 further characterized in that said isolation mounting includes a plurality of rubber mounting members supporting said frame and filter media on said filter support.

17. The filter assembly of claim 13 further characterized in that said isolation mounting includes a plurality of spring elements supporting said frame and filter media on said filter support.

18. The filter assembly of claim 13 further characterized in that said isolation mounting includes a resilient seal around the periphery of the filter frame which prevents air leakage between the filter frame and the filter support while also acting as a vibration isolator between the filter frame and the filter support.

19. In an air filter assembly, a generally flat filter panel with pleated filter media therein, the pleats having a width generally along an X axis, a length generally along a Y axis and a height generally along a Z axis, a support for the panel, means for mounting the filter panel so that it is relatively free for movement along the X axis, and means in continuous engagement with the filter panel for vibrating the filter panel along the X axis so that the individual pleats will be flexed in the direction of their width to dislodge collected material.

20. The structure of claim 19 further characterized in that the mounting means for the filter panel and the support is constructed and arranged so that the panel is held rigidly against movement along the Z axis.

21. The structure of claim 19 further characterized by and including a resilient mounting on both flat sides of the filter panel which is constructed and arranged to flex in response to vibrations applied to the panel along the X axis.

22. The structure of claim 19 further characterized in that the mounting means for the filter panel also provides for relatively free movement along the Y axis.

23. The structure of claim 19 further characterized in that the vibrating means vibrates the filter panel along the X axis only.

24. The structure of claim 19 further characterized in that the vibrating means vibrates the filter panel along both the X and Y axes.

* * * * *